(12) United States Patent
Garavan

(10) Patent No.: US 6,991,369 B1
(45) Date of Patent: Jan. 31, 2006

(54) METHOD AND CIRCUIT FOR THE PROVISION OF ACCURATELY SCALED CURRENTS

(75) Inventor: Patrick J. Garavan, Limerick (IE)

(73) Assignee: Analog Devices, Inc., Norwood, MA (US)

( * ) Notice: Subject to any disclaimer, the term of this patent is extended or adjusted under 35 U.S.C. 154(b) by 0 days.

(21) Appl. No.: 10/705,469

(22) Filed: Nov. 10, 2003

(51) Int. Cl.
  *G01K 7/01* (2006.01)
(52) U.S. Cl. .................. 374/178; 374/170; 327/512
(58) Field of Classification Search ............ 374/178, 374/170, 171, 172, 173; 327/512; 257/470
  See application file for complete search history.

(56) References Cited

U.S. PATENT DOCUMENTS

| | | | | |
|---|---|---|---|---|
| 4,165,642 A | * | 8/1979 | Lipp | 374/170 |
| 5,379,230 A | * | 1/1995 | Morikawa et al. | 327/512 |
| 5,608,348 A | * | 3/1997 | Kearney et al. | 327/538 |
| 5,961,215 A | * | 10/1999 | Lee et al. | 374/178 |
| 5,982,221 A | | 11/1999 | Tuthill | |
| 5,990,725 A | | 11/1999 | LoCascio et al. | |
| 6,008,685 A | * | 12/1999 | Kunst | 327/512 |
| 6,078,208 A | * | 6/2000 | Nolan et al. | 327/512 |
| 6,097,239 A | * | 8/2000 | Miranda et al. | 327/512 |
| 6,169,442 B1 | * | 1/2001 | Meehan et al. | 327/513 |
| 6,373,330 B1 | * | 4/2002 | Holloway | 327/539 |
| 6,529,066 B1 | * | 3/2003 | Guenot et al. | 327/539 |
| 6,554,469 B1 | * | 4/2003 | Thomson et al. | 374/178 |
| 6,664,843 B2 | * | 12/2003 | Dasgupta et al. | 327/512 |
| 6,674,185 B2 | * | 1/2004 | Mizuta | 327/512 |
| 6,808,307 B1 | * | 10/2004 | Aslan et al. | 374/178 |
| 2001/0026576 A1 | * | 10/2001 | Beer et al. | 374/141 |

OTHER PUBLICATIONS

Tuthill, Mike, IEEE Journal of Solid State Circuits, vol. 33, No. 7, Jul. 1998, pp. 1117-1122.

* cited by examiner

*Primary Examiner*—Gail Verbitsky
*Assistant Examiner*—Mirellys Jagan
(74) *Attorney, Agent, or Firm*—Wolf, Greenfield & Sacks P.C.

(57) ABSTRACT

A temperature sensor circuit is provided which is adapted to provide an indication of the temperature on a chip. The sensor includes a bandgap temperature sensor which is sequentially driven by a plurality of current sources. The current sources are shuffled so as to minimize problems associated with matching currents.

22 Claims, 4 Drawing Sheets

--PRIOR ART--

# METHOD AND CIRCUIT FOR THE PROVISION OF ACCURATELY SCALED CURRENTS

FIELD OF THE INVENTION

The invention relates to circuitry and methodology adapted to provide for the accurate provision of a current value, specifically a value for use in temperature measurement. In particular the invention relates to a complete temperature monitoring system incorporating a bandgap temperature sensor and an analog to digital converter (ADC) adapted to monitor and provide a digitized temperature reading.

BACKGROUND TO THE INVENTION

Temperature measurement circuits are well known in the art. Typical implementations take advantage of the properties of a bipolar transistor (BJT). As is well known, the base emitter voltage of such a transistor (in the case of a NPN type transistor or the emitter base voltage of the PNP equivalent) may be given to a first order approximation by the equation $$Vbe = [k*T/q] ln(Ic/Is) \qquad \text{Equation 1}$$

where k=Boltzmann's constant, T=absolute temperature, q=electronic charge, Ic=collector current, Is=device saturation current.

One commonly used technique to generate a PTAT (proportional to absolute temperature) voltage is to take the difference of two Vbe's (δVbe). A number of different implementations can be used and these allow for various trade-offs to be made. Two general circuits are shown in FIG. 1. In part A of FIG. 1, the circuit is static and does not require any switching signals, whereas part B of FIG. 1 is a dynamic circuit, i.e., uses a switched current technique.

The method of FIG. 1, part A, uses identical devices operating at a different current or scaled BJT areas and uses the same current in each (see FIG. 1a). If $$Veb1 = [k*T/q] ln(I1/A1*Is) \qquad \text{Equation 2}$$

and $$Veb2 = [k*T/q] ln(I2/A2*Is) \qquad \text{Equation 3}$$

then the difference in base emitter voltages between the two devices is given by:

$$\delta Vbe = Veb2 - Veb1 = Vptat$$

$$Vptat = [k*T/q] ln[(I2*A1)/(I1*A2)] \qquad \text{Equation 4}$$

From an examination of δVbe, as defined in Equation 4, it will be seen that it is made up from two main components. The first component kT/q is a fixed value independent of the process whereas the second term ln[(I2*A1)/(I1*A2), includes two possible sources of error. One of these can be linked to process variations in the manufacture of the two transistor devices with the resultant variations that can be introduced into the scaled value of A1/A2. The second source of error can be linked to errors associated with the current sources. The effect of both of these problems may be reduced somewhat by increasing device area at the expense of chip size.

The circuit of part B of FIG. 1 obviates the problems associated with the scaled areas of the two devices by using a single device and switching the currents into the device. The signal is generated over at least two clock phases: i.e., ph1-->Ie_q3=I3, ph2-->Ie_q3=I4 and then a comparison of the emitter voltages in both phases is effected to generate the PTAT signal. M1–M4 are the switches used to switch the currents in the various phases.

$$\delta Vbe = Vptat = [k*T/q] ln[I4/I3] \qquad \text{Equation 5}$$

Such a technique is disclosed in U.S. Pat. No. 5,982,221 which is commonly assigned to the assignee of the present invention, the disclosure of which is incorporated herein by reference. As will be appreciated from a review of this disclosure, the PTAT voltage of this implementation can be doubled by using the additional output from Q4, if desired. It will be apparent that this technique is only affected by the ratios of the two currents. By increasing the operating current levels it is possible to improve the current ratio matching, but such increases introduce problems in circuits adapted for temperature measurements in that self-heating effects are introduced. Other techniques that could be used to minimize the effect of the current matching include trimming or calibration of the circuit.

(a) Trimming:

This would typically be performed at either wafer probe or final test stage. A disadvantage of trimming is that it is typically performed at a single temperature. If the current matching changes with temperature, then this will limit the accuracy achievable. Furthermore, some form of non-volatile memory is also required which introduces additional cost, and complexity. Another factor to consider is that trimming techniques require sufficient trim resolution to achieve the required precision, which is necessary for accurate temperature measurement circuits.

(b) Calibration:

Calibration routines are typically implemented by the user, after the device is powered up. Usually, an iterative algorithm is used to calibrate out any error sources i.e., matching errors. Again, additional memory would be required to store the calibration coefficients, and a suitable calibration algorithm would need to be developed. This added complexity could make the device less attractive to the user as it may require frequent re-calibration.

A temperature to digital converter that uses a sensor based on the principle of switching accurately scaled currents is described in *IEEE Journal of Solid State Circuits*, Vol. 33, No. 7, July 1998 by Mike Tuthill. In this circuit, which is implemented in a CMOS process, a plurality (18) of current sources are provided which are ratioed in a 17:1 configuration. For each of four different switching phases a different PMOS device is selected, thereby averaging the error in the current-source ratio. To achieve this switching of the four individual devices in and out, each of the four devices are provided in the center of a current source array, surrounded by the remainder.

U.S. Pat. No. 5,990,725 describes another technique that strives to provide an accurate ratio between the two currents used to generate the PTAT voltage without requiring the techniques of trimming or calibration. This specification describes a temperature measurement with an interleaved bi-level current on a diode and bi-level current source therefore which claims to provide an accurate ratio of the measurement currents through the diode without calibration and despite process variations. The circuitry uses a plurality (x) of individual current sources wherein the higher current of the ratio is provided by the sum of the x currents and the lower current by a selected one of the x current sources. In effect, if a first current source is labelled I(1) or I1 and there are x current sources provided, then the sum of the current sources is $$\sum_{j=1}^{x} I(j)$$

and the ratio at a first instance is given by $$\left[\sum_{j=1}^{x} I(j)\right] / I1.$$

The temperature measurement is made using x higher current/lower current measuring sequences and using a different one of the x individual current sources for each sequence. It further describes how by proper ordering of the sequence used, that an output temperature may be provided which is representative of the temperature of the diode at the beginning of the x sequences, at the end of the x measurement sequence or half way between the two. A problem associated with this technique is that the values of the current across the transistor/diode for I1 and for $$\sum_{j=1}^{x} I(j)$$

are of one another. This requires the current sources to be switched on and off, which can introduce temperature variations into the chip. There therefore still exists a need to provide for an improved circuit and method that can provide an accurate source of the current ratio.

A further problem with temperature measurement circuits is the need to calibrate or test the circuitry. Typically, this is achieved by monitoring the signal output from the device under test (DUT) and comparing it with the output from other known devices such as resistive temperature devices (RTD) co-located within the test environment with the DUT. By assuming that the RTD and the DUT device are both monitoring the same temperature, one can generate a comparison between the outputs of the individual devices. Such assumptions are not always accurate as there can be temperature gradients within the test environment and as such the RTD and DUT devices are not in effect measuring the same value. There is therefore a need to provide for a circuit and technique that can provide for a better indication of the actual temperature sensed by the device under test.

SUMMARY OF THE INVENTION

These and other problems associated with the prior art are overcome at least partly by the current source arrangement in accordance with the circuit and methodology of the present invention. In accordance with a first embodiment of circuitry practicing according to the invention, the problems associated with matching currents in the generation of the PTAT voltage that is used to provide the indication of the temperature of the device is obviated by the provision of current shuffling circuitry. Such current shuffling circuitry includes a plurality of current sources.

In a first aspect of practicing the invention, useful in some embodiments of apparatus and methods, a current source circuit adapted to provide at an output an output current defined by an average of ratios of measurement currents is provided. Each ratio is provided by a plurality of (N+1) equivalent current sources coupled in common to a current output, the first term of each ratio being defined by a selected one of the plurality of current sources and the second term of each ratio being defined by the remaining current sources of the plurality of current sources, and wherein the current source circuit is further adapted to enable a selective changing of the one of the plurality of current sources providing the first term until each of the N+1 current sources has, in turn, provided the first term, the output current being equivalent to the average of the sum of ratios so determined.

In a second aspect, useful in some embodiments of apparatus and methods according to the invention, a temperature measurement circuit comprising a plurality of (N+1) equivalent current sources is provided. Each of the current sources are individually switchable to at least one transistor, the current sources being arranged to generate a PTAT voltage at the output of the at least one transistor, the PTAT voltage being defined by an applied current coupled to the at least one transistor and being representative of the temperature measured by the circuit, the applied current being provided by a ratio of the N+1 current sources, and wherein the first term of the ratio is provided by a selected one of the plurality of current sources and the second term of the ratio is provided by the remaining current sources of the plurality of current sources.

Desirably, the ratio of applied currents may be altered by varying the selected one of the plurality of current sources defining the first term of the ratio. Each of the plurality of current sources may be shuffled such that a plurality of ratios may be sequentially coupled to the at least one transistor. The shuffling of current sources is typically effected until each of the current sources defining the plurality of current sources has defined the first term of the ratio.

The circuit may further include storage circuitry adapted to store a value representative of the generated voltage for each of the shuffled ratios.

Additional components may include a digitizer, the digitizer adapted to digitise the voltage such that each of the values representative of the generated voltage is a digital word.

Desirably, averaging components adapted to define an average value for the stored values representative of the voltage determined in each of the sequential coupling steps are also provided.

The number of N+1 current sources provided is typically determined by the value of $2^n$, where n>1. "n" is usually selected from one of 3, 4, or 5 and in preferred embodiments "n" is equal to 4.

The circuitry may be defined on a single chip and the chip further includes circuitry adapted to couple a voltage defined by the base emitter voltage of the at least one transistor to a pin providing external access to the chip, the voltage being externally measurable at that external pin, thereby enabling an external calibration of the temperature sensed on-chip.

In such configurations typically two transistors are provided and two pins are provided, the circuit being adapted to couple a voltage defined by the base emitter voltage of each transistor to a corresponding pin, thereby enabling an external evaluation of the PTAT voltage generated by the difference between the two base emitter voltages.

Where one or two pins are provided at least one of the pins is desirably provided with dual functionality such that when the pin is providing the external calibration of the temperature it adopts a first level of functionality and in normal operation of the circuit the pin has a second level of functionality.

The at least one transistor is provided by either a bipolar junction transistor or is provided in a CMOS implementation, the transistor being provided by a parasitic transistor.

When two transistors are provided, each transistor may be individually switchable to each of the plurality of current sources such that through a sequential coupling of each of the transistors to either one of the current sources or the remaining of the current sources a voltage which is proportional to absolute temperature may be obtained.

In some aspects and embodiments, the invention also provides a temperature sensor chip having:
  a first set of circuitry providing at an output a temperature dependent (PTAT) voltage, a second set of circuitry adapted to digitise the PTAT voltage,
  a third set of circuitry adapted to store and average a plurality of digitised PTAT voltages, thereby providing at an output of the chip a digitised averaged measurement value representative of the temperature on the chip, and wherein
  the first set of circuitry includes a current source array and at least one transistor, the PTAT voltage being defined by a coupling of an applied current defined by a ratio of the currents provided from the current source array to the at least one transistor, the ratio having a first term provided by one of the current sources of the array and a second term provided by the remainder of the current sources of the array, and further wherein the plurality of PTAT voltages are defined by shuffling through the current source array so as to sequentially vary the ratio coupled to the at least one transistor.

Such a chip may optionally include a fourth set of circuitry, the fourth set of circuitry being adapted to couple an output from the first set of circuitry to at least one pin provided on the chip, thereby providing a set of measured voltages at that pin, the measured voltages being externally measurable using an external set of circuitry which may be coupled to that pin.

In yet other aspects and embodiments, the invention further provides a method of sensing and measuring temperature on a chip, the method comprising the steps of:
  providing a first set of circuitry adapted to provide a voltage representative of the temperature on the chip,
  providing a second set of circuitry adapted to digitise the voltage,
  providing a third set of circuitry adapted to store and average a plurality of digitised voltages, thereby providing at an output of the chip a digitised averaged measurement value representative of the temperature on the chip, and wherein
  the first set of circuitry includes a current source array and at least one transistor, the voltage being provided by a coupling of a ratio of the currents provided from the current source array to the at least one transistor, the ratio being defined by a first term equivalent to one of the current sources of the array and a second term equivalent to the remainder of the current sources or the array, and further wherein the plurality of voltages are defined by the step of shuffling through the current source array so as to sequentially vary the ratio coupled to the at least one transistor.

These and other features of the present invention will be better understood with reference to the following drawings.

DETAILED DESCRIPTION OF THE INVENTION

Figure 1:
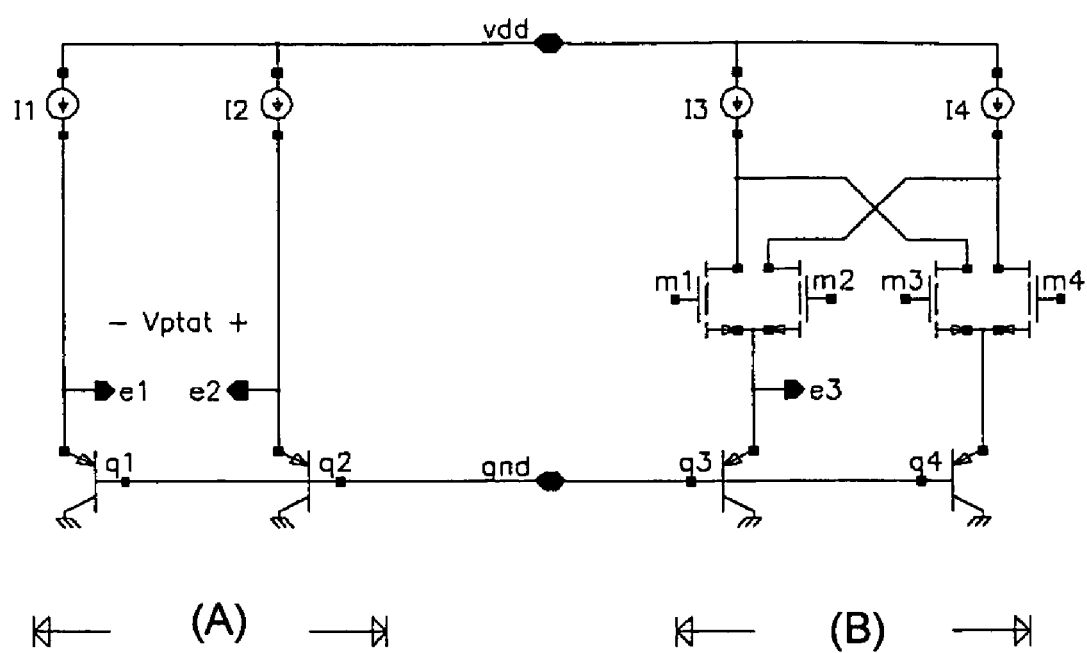
FIG. 1 is an example of a prior art temperature measurement circuit.

FIG. 1 has been described with reference to the prior art.

Figure 2:
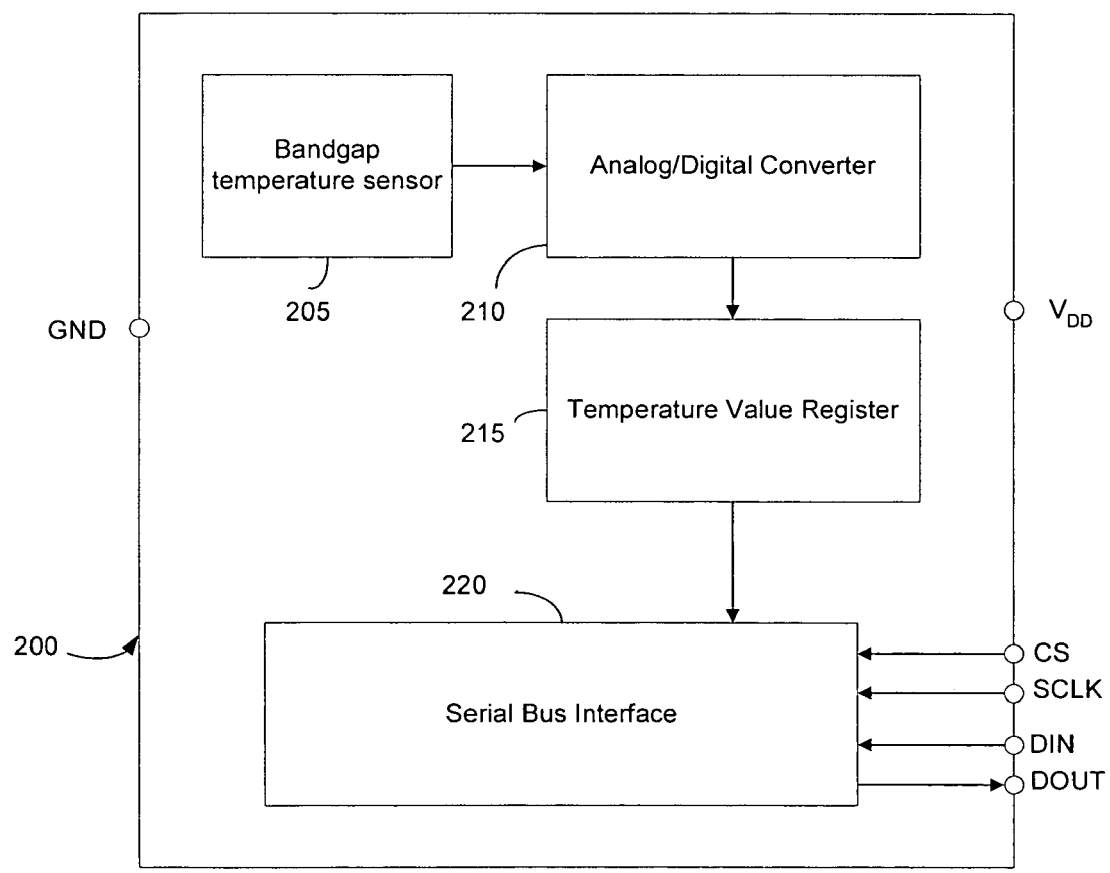
FIG. 2 is a schematic function block diagram of a temperature sensor incorporating the circuitry of the present invention.

FIG. 2 is an example of the type of temperature sensor chip that may be provided using the techniques of the present invention. As will be seen from an examination of temperature sensor 200, a bandgap temperature sensor component 205 is provided which couples an output to an analog to digital converter 210 (in this example, a 13 bit ADC). The ADC 210 is coupled to a temperature value register 215, which is in turn coupled to a serial bus interface 220. A plurality of pins GND, $V_{DD}$, CS, SCLK, DIN, and DOUT provide input and output interfaces to the chip. The packaged device provides for integrated temperature monitoring using the bandgap temperature sensor 205 and provides a digital output using the ADC 210 to digitise the temperature reading.

Figure 3:
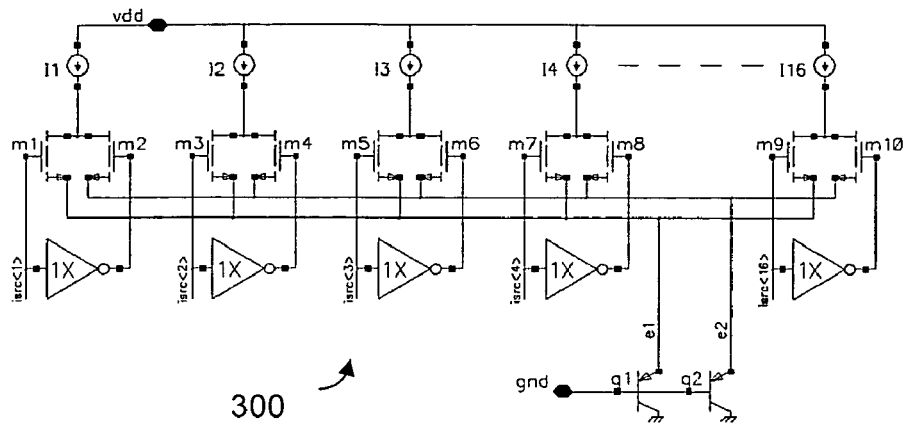
FIG. 3 is a schematic illustrating an exemplary embodiment of a bandgap temperature sensor according to the present invention.

FIG. 3 is an example of the type of circuitry that may be provided within the bandgap temperature sensor functional block of FIG. 2, in accordance with the present invention. The circuitry of FIG. 3 provides for a current shuffling scheme, which, in combination with averaging, provides for a voltage signal that is a more accurate representation of the actual monitored temperature than hereinbefore possible. The circuitry of FIG. 3 may be summarised as follows:
  (a) use an array (N+1) of "nominally" identical or equivalent current sources (I<1>: I<16> in FIG. 3)
  (b) choose (N+1) to be a binary number, i.e., N+1=$2^n$, where n>1 such that N+1=4, 8, 16, 32, etc. (n=4 and N+1=16 in FIG. 3)
  (c) for I<x>=I<1> to I<N+1>, generate Vpat(I<x>)=[k*T/q]ln[(Itotal−I<x>)/I<x>]   where   Itotal=sum(I<1>: I<N+1>)
  (d) I<x> is selected in a sequential, linear fashion, i.e., I<1>, I<2>, I<3>, I<4>, I<5>, I<6>, I<7>, . . . , I<N>, I<N+1>

With this arrangement the nominal PTAT voltage (generated at q1 or q2 emitter) is Vptat=[k*T/q]ln[N]. For each value of I<x> this voltage will be slightly different due to the current source mismatch, i.e., the ratio "N". However, by averaging all the values we significantly reduce the sensitivity to current source mismatch. For the example shown in FIG. 3, a single temperature reading (v_temp) is obtained by averaging sixteen PTAT voltages (v1 to v16) as shown in table one below. As is seen from the Vptat column of Table one, each instance of v1 to v16 is defined by a ratio of the applied currents from the current source array. A ratio has a first term commonly called a denominator and a second term called a numerator (although for the purpose of the present invention it will be understood that it is not intended to limit the definition of the first term to the denominator and the second term to the numerator as equivalently the first term could be defined by the numerator and the second term by the denominator). In each of the equations defining v1 to v16 the current source defining the first term changes, and hence the current sources providing the second term also change. Typically, the ratio is defined such that the denominator value is less than the numerator value such that the ratio is always greater than unity.

TABLE 1

| | $I(q1\_e)\_t1$ | $I(q1\_e)\_t2$ | Vptot |
|---|---|---|---|
| conv_1 | I<1> | Itotal − I<1> | $v1 = (k*T/q) * \ln((Itotal - I<1>)/I<1>)$ |
| conv_2 | I<2> | Itotal − I<2> | $v2 = (k*T/q) * \ln((Itotal - I<2>)/I<2>)$ |
| conv_3 | I<3> | Itotal − I<3> | $v3 = (k*T/q) * \ln((Itotal - I<3>)/I<3>)$ |
| conv_4 | I<4> | Itotal − I<4> | $v4 = (k*T/q) * \ln((Itotal - I<4>)/I<4>)$ |
| . | . | . | . |
| . | . | . | . |
| . | . | . | . |
| conv_16 | I<16> | Itotal − I<16> | $v16 = (k*T/q) * \ln((Itotal - I<16>)/I<16>)$ |
| | | | $v\_temp = sum(v1{:}v16)/16$ |

Figure 4:
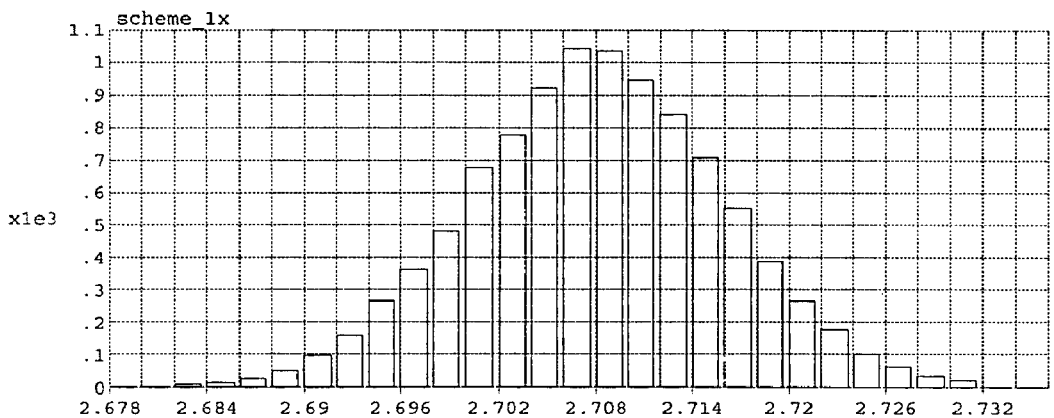
FIG. 4 is a simulated output of one set of values in accordance with the system and method of the present invention.
Figure 5:
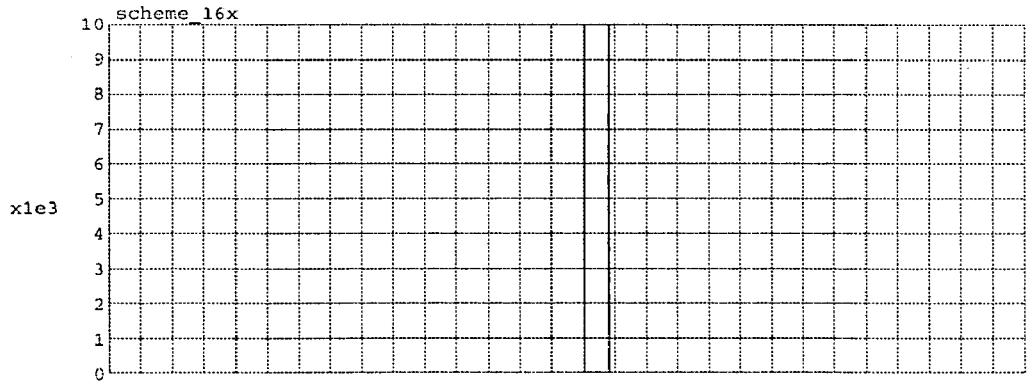
FIG. 5 is a simulated output in accordance with an averaged shuffled output in accordance with the system and method of the present invention.

The output results of the technique of FIG. 3 will be better understood from an examination of the voltage measurements shown in the simulated results of FIGS. 4 and 5. In FIG. 4, the histogram is representative of the distribution of:

$$vout = \ln[(Itotal - I<1>)/I<1>]$$

It will be seen that in this result the mean measurement of vout is 2.708 (which is derived from the ln(N) where N=15) and the standard deviation, stdev=0.287%. FIG. 5 is the same simulation run for the current shuffling scheme of Table 1 where the vout is the averaged shuffled values combined. It will be seen here that the mean is again 2.708 but in this case the standard deviation is reduced to 0.0003%, an improvement of three orders of magnitude.

Figure 6:
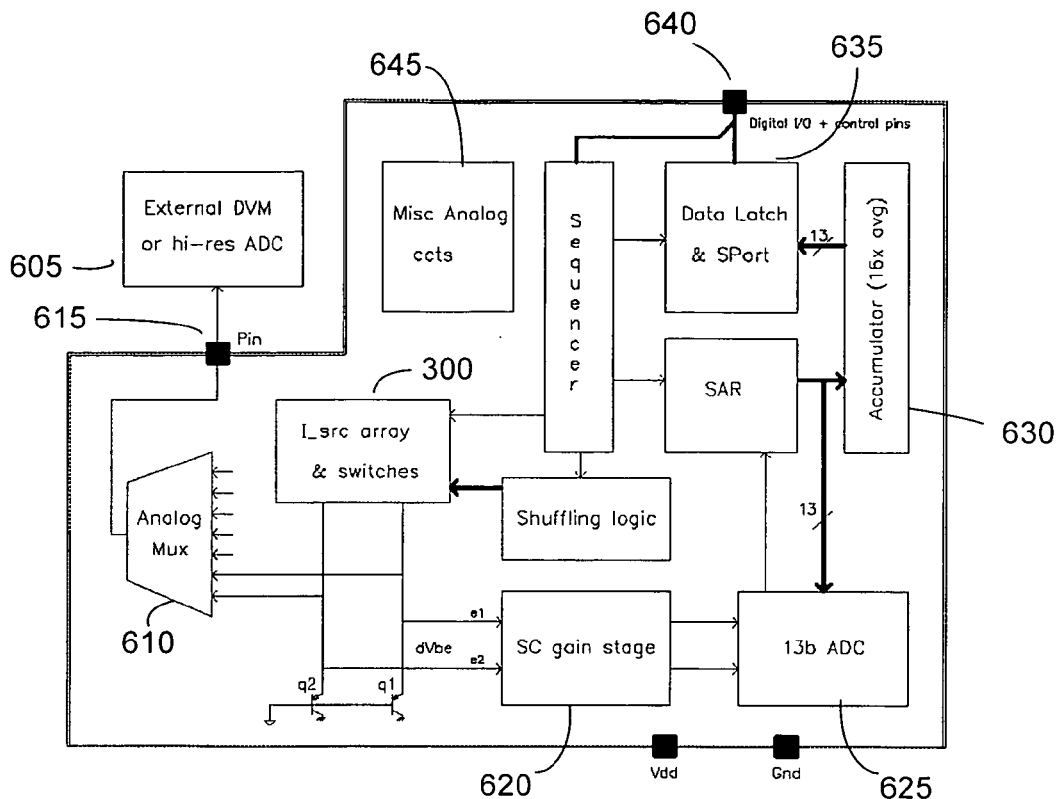
FIG. 6 is a schematic of an exemplary temperature sensor of the present invention, similar to but illustrating additional components to that of FIG. 2.

Using the current shuffling technique of the present invention it is possible to provide a chip that incorporates improved measurements of the actual on-chip temperature and which, in addition, can in testing environments provide a signal that is indicative of the temperature actually sensed on chip. As shown in FIG. 6, the current source array 300 of FIG. 3 may be used in conjunction with two measurement paths.

(a) First (Off-Chip) Measurement Circuit

A first (off-chip) measurement circuit could be either a Digital Volt Meter (DVM) 605 or a high-resolution analog-to-digital converter (ADC). This arrangement allows one to determine the on-chip temperature accurately by measuring each of the 16 voltages as described in Table 1. A total of 32 measurements are required to determine v1 . . . v16 corresponding to the 2 current settings for each, i.e., v1 is obtained from measuring Veb_q1 with I=I<1> and I=Itotal−I<1> and taking the difference in Veb's. Each of the voltages are fed from the current source array 300 via a multiplexer 610 and a single package pin 615 is used by the DVM 605 for access. In accordance with preferred embodiments or applications of the present invention, such as that shown in FIG. 2, this could be shared with an existing pin function. Digital control is provided through the serial port, although it will be appreciated that the present invention is not intended to be limited to any one set of configuration parameters. It will be further appreciated that the arrangement of FIG. 2 indicates the provision of a single package pin used to access the current source array. It will be understood that certain arrangements may require the use of two or more pins. Although this is not shown in FIG. 6, it will be understood that by providing access to each of the two transistors q1 and q2 via a separate pin, that measurements of the base emitter voltage of each transistor can be measured and used to evaluate the difference which is equivalent to the PTAT voltage.

(b) Second (On-Chip) Sensor Signal Path

A second (on-chip) signal path comprises the following elements:

(1) a precision switched capacitor (SC) gain stage 620 such as that described in U.S. Pat. No. 5,982,221 for example, the content of which is incorporated herein by way of reference;

(2) a digitizer or analog-to-digital converter (ADC) (e.g., this example shows a 13-bit successive approximation (SA) ADC 625); and (3) a digital averaging circuit (accumulator) which performs the summation and averaging function 630.

As detailed in Table 1, sixteen conversions (measurements) are performed as the current sources are shuffled. Each con-version digitizes the δVbe (or PTAT voltage) produced by the temperature sensor circuit. As each conversion is performed, the digital result is accumulated. After sixteen conversions, the final result is obtained and the accumulator is reset in preparation for the next reading. The final digitized reading is loaded into a data latch 635 and can then be read through the serial port (SPort) 640. The higher the ADC resolution/accuracy the better the final result.

Figure 7:
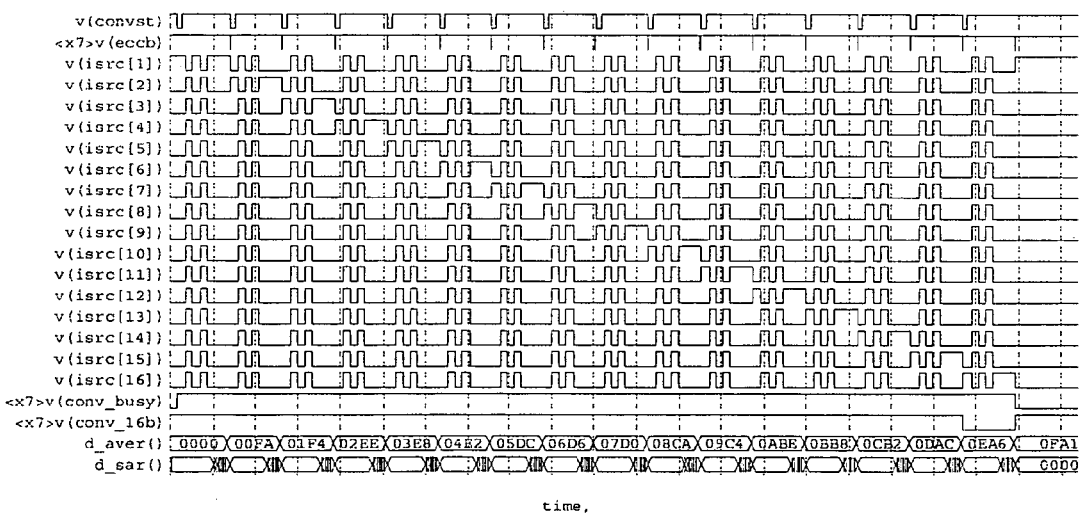
FIG. 7 is an example of a timing sequence in accordance with the operation of the system of FIG. 6.

To determine the accuracy of the temperature sensor, we compare the results obtained in (a) and (b), above. Shown in FIG. 7 is the current shuffling timing sequence for a single measurement, which comprises sixteen conversions, and is an example of the operation of a device according to the present invention. The conversion clock for the timing sequence shown in FIG. 7 is internally generated so no external clock is required except when reading from and writing to the serial port. In normal mode, an internal clock oscillator runs an automatic conversion sequence. During this automatic conversion sequence a conversion is initiated every one second. At this time, the part powers up its analog circuitry and performs a temperature conversion. This temperature conversion typically takes 1 ms, after which time the analog circuitry of the part automatically shuts down. The analog circuitry powers up again when the one second timer times out and the next conversion begins. The result of the most recent temperature conversion is always available in the serial output register as the serial interface circuitry never shuts down. The components of the part can be placed in a shutdown mode, via the Control Register, in which case, the on-chip oscillator (present within the miscellaneous analog circuitry block 645 of FIG. 6) is shut down and no further conversions are initiated until the part is taken out of shutdown mode. The conversion result from the last conversion prior to shutdown can still be read from the part even when it is in shutdown mode.

In the normal conversion mode, every time a read or write operation takes place the internal clock oscillator is reset at the end of the read or write operation. This causes the device to start a temperature conversion and the result is typically available 1 ms later.

Similarly, when the part is taken out of shutdown mode, the internal clock oscillator is started and a conversion is initiated. The conversion result is available typically 1 ms later. Reading from the device before a conversion is complete will cause the part to stop converting and only start again when serial communication is finished. This read operation will provide the previous result.

One effect of using current shuffling is to obtain an "average" temperature reading as the measurement cycle is longer. Additional benefits are improved noise performance, and the nominal current remains constant during the measurement cycle, i.e., minimal variation in device power dissipation or self-heating. This scheme also reduces the effects of varying "gnd IR" drops.

It should be noted that while FIG. 3 shows dual bipolar junction transistors (BJT's) (q1, q2), the method of the present invention may also be applied to a single BJT device where the second BJT could be replaced with a short cct to gnd if desired. Furthermore, although the invention has been described with reference to BJT it will be appreciated that it may equivalently be implemented in CMOS technology using parasitic npn or pnp transistors.

It will be further appreciated that while the exemplary embodiment of the current sources shown in FIG. 3 is provided with sixteen such sources, that it is not intended to limit the present invention to any specific number. For the purposes of the digitisation of the signal it is convenient that the number of sources is $2^n$ (n being a positive integer value) so as to simplify the conversion. It is desirable that n>3, otherwise the effects of the averaging are minimal and if n>>4 then the iteration process takes too long without significant gain in performance or accuracy. Therefore, it has been found that 16 (n=4) is an optimal, though not essential, value for the number of sources.

The present invention enables the provision of an on-chip temperature sensor that allows an accurate measurement of the ambient temperature. In one application, the measurable temperature range is −40° C. to +150 C, and accuracy values of ±0.5° C. are achievable in this range. Typically, the circuitry is operable with supply voltages +2.7 V to +5.5 V. Although it has been described with reference to a 6-pin package, this it will be appreciated it modifiable and other package configurations such as 8-lead microSOIC packages are possible. When used with a 13 bit ADC, the temperature reading to +0.03125° C. resolution is typical.

What has been described herein is an improved circuit and technique for providing a ratio value of two currents. In accordance with the present invention, the use of such a shuffled averaging technique provides for a more accurate value of a PTAT voltage from a bandgap temperature sensor than hereinbefore possible. The present invention provides for circuitry than can provide an on-chip measurement value of the actual temperature, and can also provide the temperature value in a digitised word.

Although the invention has been described with reference to preferred embodiments, parameters and performance values, it will be understood that it is not intended that the invention be limited in any way except as may be deemed necessary in the light of the appended claims. It will be also understood that although specific features of the invention are shown in some drawings and not others, this is for convenience only as each feature may be combined with any or all of the other features in accordance with the invention.

Furthermore, unless the context clearly requires otherwise, throughout the description and the claims, the words 'comprise', 'comprising', and the like are to be construed in an inclusive sense, as opposed to an exclusive or exhaustive sense; that is to say, in the sense of "including, but not limited to".

What is claimed is:

1. A current source circuit adapted to provide at an output an output current defined by an average of ratios of measurement currents, each ratio provided by a plurality of (N+1) equivalent current sources coupled in common to a current output, the first term of each ratio being defined by a selected one of the plurality of current sources and the second term of each ratio being defined by only the remaining current sources of the plurality of current sources, and wherein the current source circuit is further adapted to enable a selective changing of the one of the plurality of current sources providing the first term until each of the N+1 current sources has, in turn, provided the first term, the output current being equivalent to the average of the sum of ratios so determined.

2. A temperature measurement circuit comprising a plurality of (N+1) equivalent current sources, each of the current sources being individually switchable to at least one transistor, the current sources being arranged to generate a PTAT voltage at the output of the at least one transistor, the PTAT voltage being defined by an applied current coupled to the at least one transistor and being representative of the temperature measured by the circuit, the applied current being provided by a ratio of the N+1 current sources, and wherein the first term of the ratio is provided by a selected one of the plurality of current sources and the second term of the ratio is provided by only the remaining current sources of the plurality of current sources.

3. The circuit as claimed in claim 2 wherein the circuitry is defined on a single chip and the chip further includes circuitry adapted to couple a voltage defined by the base emitter voltage of the at least one transistor to a pin providing external access to the chip, the voltage being externally measurable at that external pin, thereby enabling an external calibration of the temperature sensed on-chip.

4. The circuit as claimed in claim 3 wherein two transistors are provided and two pins are provided, the circuit being adapted to couple a voltage defined by the base emitter voltage of each transistor to a corresponding pin, thereby enabling an external evaluation of the PTAT voltage generated by the difference between the two base emitter voltages.

5. The circuit as claimed in claim 3 wherein the pin is provided with dual functionality such that when the pin is providing the external calibration of the temperature it adopts a first level of functionality and in normal operation of the circuit the pin has a second level of functionality.

6. The circuit as claimed in claim 2 wherein the at least one transistor is provided by a bipolar junction transistor.

7. The circuit as claimed in claim 2 wherein the at least one transistor is provided in a CMOS implementation, the transistor being provided by a parasitic transistor.

8. The circuit as claimed in claim 2 wherein two transistors are provided, each transistor being individually switchable to each of the plurality of N+1 current sources and wherein through a sequential coupling of each of the transistors to either one of the current sources or the remaining of the current sources a voltage which is proportional to absolute temperature may be obtained.

9. The circuit as claimed in claim 2 wherein two transistors are provided, each transistor being adapted to provide a PTAT voltage, the PTAT voltage of the first transistor being out of phase with that of the second transistor.

10. The circuit as claimed in claim 9 being adapted such that, in use, at any one instant a current defined by the first term of the ratio is coupled to the first transistor and a current defined by the second term of the ratio is coupled to the second transistor.

11. The circuit as claimed in claim 2 wherein the number (N+1) of current sources provided is determined by the value of $2^n$, where n>1.

12. The circuit as claimed in claim 11 where n is selected from one of 3, 4, or 5.

13. The circuit as claimed in claim 12 wherein n is equal to 4.

14. The circuit as claimed in claim 2 being further adapted to enable a selective changing of the one of the plurality of current sources providing the first term of the ratio.

15. The circuit as claimed in claim 14 being further adapted to enable a shuffling through the N+1 current sources to change the selected one of the current sources providing the first term of the ratio, thereby sequentially coupling a plurality of applied currents, each defined by a ratio of the N+1 current sources, to the at least one transistor.

16. The circuit as claimed in claim 15 being further adapted to effect the shuffling of the current sources until each of the N+1 current sources has, in turn, provided the first term of the ratio.

17. The circuit as claimed in claim 16, further including storage circuitry adapted to store a value representative of the generated voltage for each of the shuffled ratios.

18. The circuit as claimed in claim 17 further including a digitizer, the digitizer adapted to digitise the voltage such that each of the values representative of the generated voltage is a digital word.

19. The circuit as claimed in claim 17 further including averaging components adapted to define an average value for the stored values representative of the voltage determined in each of the sequential coupling steps.

20. A method of sensing and measuring temperature on a chip, the method comprising the steps of:
providing a first set of circuitry adapted to provide a voltage representative of the temperature on the chip,
providing a second set of circuitry adapted to digitise the voltage,
providing a third set of circuitry adapted to store and average a plurality of digitised voltages, thereby providing at an output of the chip a digitised averaged measurement value representative of the temperature on the chip, and wherein
the first set of circuitry includes a current source array and at least one transistor, the voltage being provided by a coupling of an applied current defined by a ratio of the currents provided from the current source array to the at least one transistor, the ratio being defined by a first term equivalent to one of the current sources of the array and a second term equivalent to the remainder of the current sources or the array, and further wherein the plurality of voltages are defined by the step of shuffling through the current source array so as to sequentially vary the ratio coupled to the at least one transistor.

21. A temperature sensor chip having:
a first set of circuitry providing at an output a temperature dependent (PTAT) voltage,
a second set of circuitry adapted to digitize the PTAT voltage,
a third set of circuitry adapted to store and average a plurality of digitized PTAT voltages, thereby providing at an output of the chip a digitized averaged measurement value representative of the temperature on the chip, and wherein
the first set of circuitry includes a current source array and at least one transistor, the PTAT voltage being defined by a coupling of a ratio of the currents provided from the current source array to the at least one transistor, the ratio being defined by a first term equivalent to one of the current sources of the array and a second term equivalent to the remainder of the current sources of the array, and further wherein the plurality of PTAT voltages are defined by shuffling through the current source array so as to sequentially vary the ratio coupled to the at least one transistor.

22. The chip as claimed in claim 21 further including a fourth set of circuitry, the fourth set of circuitry being adapted to couple an output from the first set of circuitry to at least one pin provided on the chip, thereby providing a set of measured voltages at that pin, the measured voltages being externally measurable using an external set of circuitry which may be coupled to that pin.

* * * * *